J. H. Howe. Tobacco Dressing Machine.
No. 120,069. Fig. 1. Patented Oct. 17, 1871.
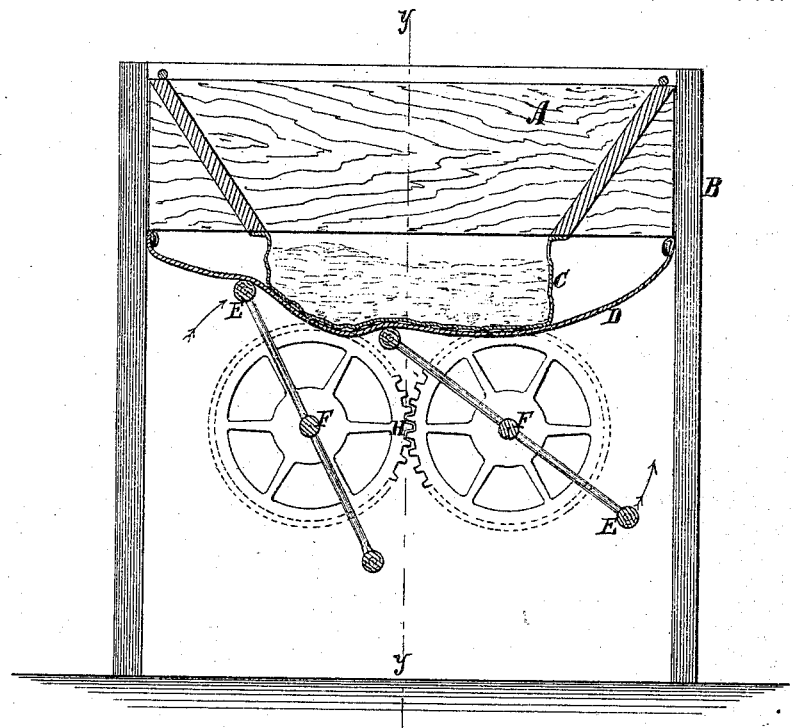
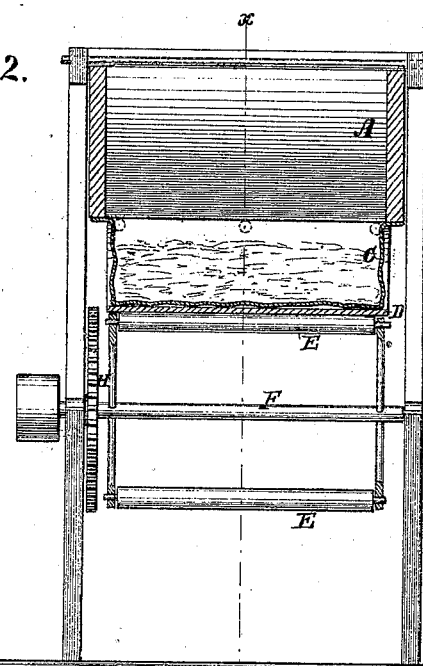
Fig. 2.
Witnesses:
A. Bennerendorf.
Wm. H. C. Smith.
Inventor:
J. H. Howe
Per Munn & Co
Attorneys.

UNITED STATES PATENT OFFICE.

JAMES H. HOWE, OF UTICA, NEW YORK.

IMPROVEMENT IN TOBACCO-DRESSING MACHINES.

Specification forming part of Letters Patent No. 120,069, dated October 17, 1871.

*To all whom it may concern:*

Be it known that I, JAMES H. HOWE, of Utica, in the county of Oneida and State of New York, have invented a new and Improved Tobacco-Dressing Machine; and I do hereby declare that the following is a full, clear, and exact description thereof, which will enable others skilled in the art to make and use the same, reference being had to the accompanying drawing forming part of this specification.

This invention relates to improvements in machinery for loosening and separating the strings of fine-cut tobacco, which adhere together after being cut on account of the packing of the leaves previous to cutting, and of the adhesive substance used for sweetening the tobacco. The said invention consists in a hopper with a flexible bottom in which the cut tobacco is placed, and two or more pairs of rotary beaters acting against the said flexible bottoms by revolving under it, in a manner to thoroughly separate and loosen the strings from each other, and to work the adhering bunches into soft fleecy masses.

Figure 1 is a longitudinal sectional elevation of my improved machine taken on the line $x\ x$ of Fig. 2, and Fig. 2 is a transverse section taken on the line $y\ y$ of Fig. 1.

Similar letters of reference indicate corresponding parts.

A is a hopper mounted on any suitable supporting-frame, B, and having a large flexible bottom portion of muslin, canvas, leather, or other suitable substance, C, forming a sack of considerable breadth and depth, and under this I prefer to stretch a broad strip or sheet of canvas or leather, D, from side to side of the frame, and below this sheet I arrange two or more pairs of rotary beaters, E, on parallel shafts F, geared together by wheels H, for being driven by one driving-belt; also, for having the beaters turn in opposite directions, so that the movement given to the sack and its contents by one set will be counteracted by the other set.

The tobacco, when cut from the thick mass of leaves packed together, adheres in thin ribbons or shavings made up of strings, connected side by side, and is commonly separated and loosened by a rapidly up-and-down-shaking machine, which is expensive to keep in repair owing to the great wear and tear occasioned by the rapid movements necessary, and the sudden stopping and starting. The said machines are also objectionable on account of the great amount of power required to operate them.

It will be seen that in this machine these objections are avoided; the motion being slow and the moving parts operating continually in one direction require but little power, and the wear will be slight, while the work is accomplished by it in the most satisfactory manner.

Having thus described my invention, I claim as new and desire to secure by Letters Patent—

1. The hopper A, with a flexible bottom, C, and the rotary beaters E combined, substantially as specified.

2. The combination, with the hopper A C and rotary beaters, of the flexible sheet D, substantially as specified.

JAMES H. HOWE.

Witnesses:
 GEO. W. MABEE,
 ALEX. F. ROBERTS.